Figure 1:
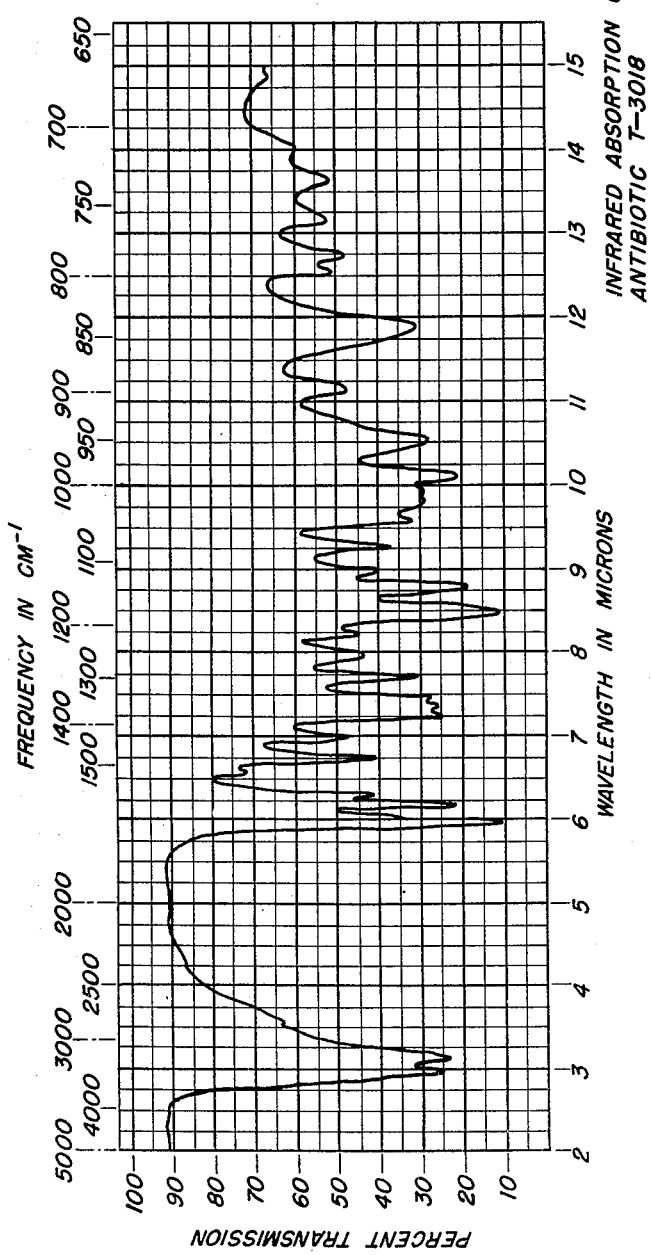

Nov. 24, 1959 S. O. THOMAS ET AL 2,914,525
NUCLEOCIDIN AND THE PROCESS OF OBTAINING THE SAME
Filed March 18, 1957

INVENTORS.
SAMUEL O. THOMAS
VERNON L. SINGLETON
JAMES A. LOWERY
BY
ATTORNEY.

2,914,525
NUCLEOCIDIN AND THE PROCESS OF OBTAINING THE SAME

Samuel Owen Thomas, Pearl River, and James Alfred Lowery, New City, N.Y., and Vernon Le Roy Singleton, Kaneohe, Oahu, Hawaii, assignors to American Cyanamid Company, New York, N.Y., a corporation of Maine Application March 18, 1957, Serial No. 647,179

6 Claims. (Cl. 260—211.5)

This invention relates to a new antibiotic and to processes of obtaining the same. More particularly, the invention relates to an antibiotic substance produced by strains of microorganisms of a hitherto undescribed species of Streptomyces, which antibiotic and its salts are effective against trypanosomes, amoebae, and gram negative and gram positive bacteria. The invention includes the antibiotic now called Nucleocidin, its salts, and methods of producing and isolating the same.

Nucleocidin in its purified state is a white crystalline material having weakly basic properties. One analytical sample prepared as described hereinafter gave the following results on elemental analysis: carbon 34.03—hydrogen 4.05—nitrogen 21.60—sulphur 8.30—oxygen 32.02, by difference. The compound is of relatively low molecular weight. Its empirical formula based on the above analysis corresponds closely to $C_{11}H_{16}N_6O_8S$.

The new antibiotic is almost completely stable in water at room temperature for 24 hours at hydrogen ion concentrations of pH 3, pH 7, and pH 9. At elevated temperatures it shows some instability, particularly at 100° C. and over.

The infrared absorption spectra of the antibiotic is shown in Figure 1. This curve which is a draftman's reproduction of a tracing made by a Perkin-Elmer Automatic Recording Infrared Absorption Spectrophotometer Model 21 was determined on a sample of the material which had been mixed with crystals of KBr and pressed into a disc. The original curve was made on the machine under the following conditions: Prism=NaCl; Resolution=2; Response=1–1; Gain=5; Speed=½ min./u; Suppression=2; Scale=2″/u. Significant absorption bands were observed at the following frequencies expressed in microns:

| | |
|---|---|
| 2.87 | 8.76 |
| 2.99 | 8.96 |
| 3.13 | 9.26 |
| 5.96 | 9.56 |
| 6.18 | 9.83 |
| 6.29 | 9.95 |
| 6.58 | 10.20 |
| 6.75 | 10.54 |
| 7.00 | 11.15 |
| 7.24 | 11.87 |
| 7.36 | 12.55 |
| 7.45 | 12.71 |
| 7.71 | 13.16 |
| 7.99 | 13.63 |
| 8.24 | 14.00 |
| 8.46 | |

Figure 2:
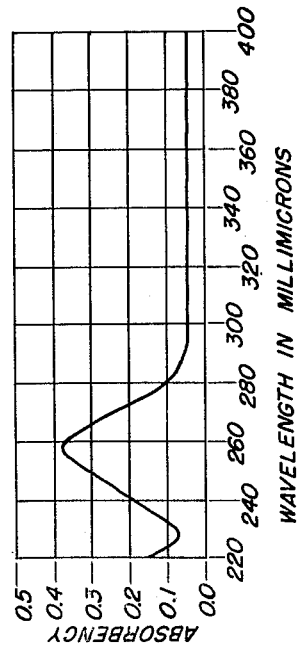

The ultraviolet absorption spectrum with an aqueous solution containing 10 gammas per milliliter of the antibiotic at pH 7.0 is shown in Figure 2. The maximum absorption peak is at 256 millimicrons and at that value the molecular extinction coefficient is 15,500.

The optical rotation of a purified sample of the antibiotic was $[\alpha]_D 24.5 = 33.3$ (1.052 grams in 100 ml. of 50 percent ethanol–50 percent 0.1 N hydrochloric acid. Corrected observed rotation=0.35° in a 1 dec. tube).

The new antibiotic is soluble in the following solvents at room temperature at approximately the levels indicated which are expressed in milligrams per milliliter of solvent:

| | |
|---|---|
| Water.pH 3.5 | [1] 5.8 |
| Water.pH 6.5 | [1] 1.9 |
| Water.pH 9.25 | [1] 26.8 |
| Methanol | [1] 14.2 |
| Acetone | 4.8 |
| n-Butanol | 0.25 |
| Ethyl acetate | 0.36 |
| Benzene | 0.137 |
| Ether | 0.031 |

[1] These figures obtained gravimetrically.

The new antibiotic of the present invention is strongly adsorbed on activated carbon over a wide range of hydrogen ion concentrations ranging from below pH 3 to above pH 9. It is weakly adsorbed on such common adsorbents as activated magnesium silicate, alumina, alpha cellulose, and fuller's earth under acidic, neutral and alkaline pH conditions. It can be adsorbed on cationic exchange resins from neutral or slightly alkaline solutions and can be eluted therefrom with an acidic or basic solution.

Degradation studies have indicated that Nucleocidin has the following structure:

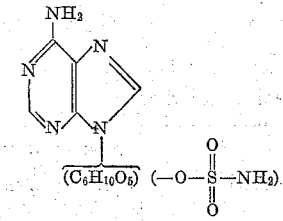

The new antibiotic is highly active against trypanosomes such as *Trypanosoma equiperdum* and amoebae such as *Endamoeba histolytica* and is, therefore, of value in treating disease caused by these microorganisms in animals in the amounts and manner prescribed by the attending veterinarian. It is also active against various bacteria as shown in the following table, in which its bacterial spectrum is illustrated using a solution of 200 micrograms per milliliter of the antibiotic in 20 percent aqueous methanol, in the standard agar diffusion procedure:

| Organism: | Zone width, mm. |
|---|---|
| B. cereus Waksman | 8.0 |
| K. pneumoniae (Friedlander's) | 2.9 |
| Salmonella gallinarum pH 7.8 | 7.0 |
| Salmonella gallinarum pH 6.0 | 6.1 |
| Alcaligenes sp. ATCC10153 | sl. |
| Staph. aureus (No. 209) | 6.0 |
| B. subtilis pH 7.8 | 8.9 |
| B. subtilis pH 6.0 | 9.4 |
| B. subtilis streptothricin resistant | 3.0 |
| M. ranae | 0 |
| M. tuberculosis pH 7.8 | 2.9 |
| M. tuberculosis pH 6.0 | 7.1 |
| Staph. albus | 8.0 |
| K. pneumoniae | 7.5 |
| E. coli | 7.0 |
| Streptococcus haemolyticus NY5 | 16.1 |
| Corynebacterium xerose | 7.0 |

Trypanosomiasis in animals of economic importance occurs in various parts of the world and is caused by several different species of the protozoan genus Trypanosoma. In Africa, cattle and swine are seriously affected, the principal species being *T. congolense, T. vivax* and *T. simiae*. Elsewhere, various other species cause serious diseases in equines, camels, sheep and goats. *T. equiperdum* causes a disease known as dourine in equines. This occurs in southern Europe, Asia, North and South America, and South Africa.

Because of the economic important of trypanosomisis in many types of livestock, a search for new drugs to treat and cure the disease has been made. Obviously it is not possible to use large animals for laboratory investigations and work of this kind. Fortunately, most species of trypanosomes can be inoculated experimentally into small laboratory animals and produce fatal infections comparable to those which occur in the natural hosts. Experimental infections in mice, rats, rabbits, or guinea pigs, using one or several species of trypanosomes, are utilized. A standardized infection in mice with *T. equiperdum* was used in our work since it is invariably fatal unless effective treatment is given.

The validity of this work is demonstrated by the fact that the current drugs of choice for the treatment of cattle trypanosomiasis were first evaluated in mice and the data was used to project dosage schedules to cattle. With all compounds now used to treat trypanosomiasis in cattle and horses, the carry-over of activity from the mouse test was 100%.

A comparison of the effectiveness of Nucleocidin against *T. equiperdum* in mice was made against Antrycide sulfate and Suramin sodium. The former being 4-amino-6-(2-amino-6-methyl-4-pyrimdylamino) quinaldine-1,1' dimethosulfate; and the latter Hexasodium sym.-bis (m-amino-p-methylbenzoyl-1-naphthylamino - 4,6,8-trisulfonate) carbamide. Mice were given a single intramuscular dose of the drugs as shown in the following table with the results as indicated.

| Compound | Single Intramuscular Dose, mg./kg. | Median Survival Time, Days | Activity |
|---|---|---|---|
| Nucleocidin | 0.1 | >30 | Curative. |
|  | 0.05 | >30 | Do. |
|  | 0.02 | 8 | Suppressive. |
|  | 0.01 | 7 | Do. |
| Antrycide sulfate | 5.0 | >30 | Curative. |
|  | 2.5 | >30 | Do. |
|  | 1.0 | 13 | Suppressive. |
|  | 0.8 | 12.5 | Do. |
|  | 0.4 | 8 | Do. |
| Suramin sodium | 5.0 | >30 | Curative. |
|  | 2.5 | >30 | Do. |
|  | 1.0 | 5 | Suppressive. |
|  | 0.8 | 5 | Do. |
|  | 0.4 | 4 | Do. |
| Non-treated |  | 4 |  |

These results indicated that a single parenteral dose, 0.01 to 0.1 mg./kg. of Nucleocidin should be effective in treating cattle and horses with trypanosomiasis.

In addition to the antitrypanosomal activity of Nucleocidin, it is also effective against experimental amebiasis in guinea pigs. The protozoan *Endamoeba histolytica* is the causative agent of amebiasis. Dogs may become infected. Serious symptoms may develop, and untreated infections may be fatal. The disease is widespread throughout the world.

Experimental evalutions of the activity of compounds against this parasite are usually conducted in laboratory animals infected with virulent strains of *Endamoeba histolytica*. Most compounds recently introduced for the treatment of amebiasis in dogs were first evaluated in experimentally-infected guinea pigs or rats, and effective doses were projected to the naturally-infected hosts.

In guinea pigs experimentally infected with *Endamoeba histolytica*, Nucleocidin has proven effective in multiple oral doses of 0.125 and 0.25 mg./kg. twice daily for five days (total dosage=1.25 and 2.5 mg./kg.) and in single oral doses of 1.0 mg./kg. This degree of activity is considerably greater than that of other known amebacides, such as Diodoquin, milibis, Carbarsone and the Tetracyclines.

Nucleocidin is highly toxic to rats and mice when added to their feed and is useful in this regard as a rodenticide.

To a commercially available rat diet was added varying amounts of Nucleocidin and groups of rats were allowed to eat this material adlibitum. The rat diet was composed of the following ingredients: meat meal, dried skimmed milk, wheat germ, fish meal, liver meal, dried beet pulp, corn grits, oat middlings, soybean oil meal, dehydrated alfalfa meal, cane molasses, vitamin $B_{12}$ supplement, riboflavin supplement, brewers' dried yeast, thiamin, niacin, vitamin A feeding oil, D activated plant sterol, .5% defluorinated phosphate, .5% iodized salt, .02% manganese sulfate.

A concentration of 0.05 percent of Nucleocidin in the feed killed all of the rats allowed access to this feed within three days. From the amount of the rodenticide consumed by the rats, it was estimated that 750 gammas of Nucleocidin per rat was ingested on the first day (about 1.9 mg./kg.) and 250–500 gammas on the second day (about 0.9 mg./kg). A concentration of Warfarin—3-γ-phenyl-β-acetylethyl - 4 - hydroxycoumarin, a well known rodenticide required to kill rats is 0.1% in the feed over a period of four days.

Nucleocidin is produced by a species of Streptomyces bearing the ATCC No. 13,382. Further investigation of the taxonomy of this microorganism indicates that it is a previously undescribed species. It has been named *Streptomyces calvus* (calvus meaning bald or bare) because of its generally poor display of aerial mycelium and sporulation on most media as shown in Table I. On those media which support aerial growth and sporulation, the mycelium at first appears white, later becoming Drab Gray to Light Mouse Gray with the maturation of spores; sporulation was heaviest on starch-containing media (Waksman starch and Czapek starch). The vegetative mycelium grows appressed, often spreading, and is colorless to Ivory Yellow or even Honey Yellow on some media. The reverse coloration of the colonies varies with the medium from colorless to Ivory Yellow or Honey Yellow and occasionally to Cinnamon-Buff. Soluble pigment is not produced by the parent culture; however, some induced mutant strains have been observed to produce a limited amount of yellowish pigment. Although *S. calvus* will grow at widely divergent temperatures, it was established that the optimum range both for growth and sporulation is 32°–37° C.

Spores of *S. calvus* are borne in short chains which sometimes form short loose spirals of one to several turns; individual spores are globose to elongate (0.6–1.0μ in globose cells to 0.6–1.0μ x 1.0–1.8μ in elongate cells).

One physiologic property of *S. calvus*, which separates it from most other Streptomyces, is its capacity to cause formation of crystalline pellets of indeterminate nature in growth zones on calcium malate agar; these pellets effervesce in the presence of acids.

The carbon source utilization pattern of *S. calvus* (T-3018) was determined to be as follows: d-fructose, i-inositol, lactose, d-mannitol, d-raffinose, l-rhamnose, sucrose, d-trehalose and d-xylose are readily utilized; l-arabinose, d-melibiose and salicin are utilized very poorly; dextran, esculin, d-melezitose and adonitol are not utilized at all.

The determinations were made by the technique of Pridham and Gottlieb: "The utilization of carbon compounds by some Actinomycetales as an aid for species determination, Jour. Bact. 56: 107, 1948."

TABLE I

*Cultural and physiologic characteristics of Streptomyces calvus (Incubation 14 days at 32° C.)*

| Medium | Amount and Nature of Growth | Amount and Color of Aerial Mycelium and Spores | Color of Vegetative Mycelium | Reverse Color | Diffusible Pigment | Remarks |
|---|---|---|---|---|---|---|
| Asparagine dextrose Meat Extract Agar pH 6.5–6.7. | Moderate | Scanty; white aerial growth; No sporulation. | Colorless to Cream Color.[1] | Colorless to Cream Color. | None | |
| Asparagine dextrose Meat Extract agar, pH 5.0. | Fair | None | Colorless to Yellowish. | do | do | |
| Bennett agar | Moderate; Spreading | Scanty; white aerial growth; No sporulation. | do | Near Cinnamon Buff. | do | |
| Calcium malate agar | Moderate | Scanty; white to Drab Gray in sporulating areas of aerial growth. Sporulation very light. | White to Cream Buff to Honey Yellow. | Colorless to near Honey Yellow. | do | Wide zone of malate clearing; crystalline pellets formed in growth zones. |
| Corn steep liquor agar | Light; Spreading. | Scanty; white aerial growth; No sporulation. | Light yellowish to tan. | Chamois to Honey Yellow. | do | |
| Czapek-Dox agar | Moderate; Spreading. | Scanty; white to Drab Gray in sporulating areas. | Cream-Buff to Chamois. | Chamois | do | |
| Czapek-Dox Starch agar | do | Moderate, white to Light Mouse Gray in sporulating areas; Sporulation light. | Colorless to Chamois. | Colorless to Light Buff to Cream Color. | do | Slight starch hydrolysis. |
| Emerson agar | do | Scanty; white to Light Mouse Gray in sporulating areas; Sporulation very light. | Light yellowish | Honey Yellow | do | |
| Krainsky dextrose agar | Fair | Scanty; white aerial growth; No sporulation. | Ivory Yellow | Ivory Yellow to Cream-Buff. | do | |
| Potato dextrose agar | Moderate; Spreading. | Scanty; white to Light Mouse Gray in sporulating areas; Sporulation very light. | Colorless to Ivory Yellow to Cream-Buff. | Colorless to Ivory Yellow to Cream-Buff. | do | |
| Sabouraud maltose agar | Good; Spreading. | Scanty; white aerial growth; No sporulation. | Colorless to Cream-Buff. | Honey Yellow to Ochraceous. | do | |
| Waksman dextrose agar | Moderate; Spreading. | do | Colorless to Yellowish. | Colorless to Chamois to Honey Yellow. | do | |
| Waksman nutrient agar | Moderate | do | Light yellowish | Cream-Buff | do | |
| Waksman starch agar | Moderate; Spreading. | Moderate; white to Drab Gray or Light Mouse Gray in sporulating areas. Sporulation fair. | Colorless to Chamois. | Colorless to Chamois; darkened areas Drab-Gray. | do | Slight starch hydrolysis. |
| Yeast extract agar | do | Scanty; white to Drab Gray; No sporulation. | Light yellowish | Chamois to Honey Yellow. | do | |
| Carrot plugs | Poor | None | Colorless to Yellowish. | | | |
| Potato plugs | Moderate | Scanty; white to Light Mouse Gray. | Clay Color | | | Plug discolored. |
| Gelatin | do | None | Colorless to Yellow. | | None | Partial liquefaction. |
| Purple Milk | Light | do | Colorless to Yellowish. | | do | Precipitation of casein and moderate peptonization; final pH 7.2. |
| Cellulose (Filter paper in Czapek Solution). | do | do | Yellowish | | do | No Decomposition after 21 days. |

[1] Italicized colors are those of Ridgway (8).

THE FERMENTATION PROCESS

The process by which the new antibiotic is produced is preferably an aerobic fermentation of an aqueous nutrient medium inoculated with the new organism described above. The constituents of the fermentation medium and the conditions of the fermentation are generally those of other fermentation processes in which fungi are employed to produce antibiotics.

Sources of carbon include starch, hydrolyzed starch, sugars such as lactose, maltose, dextrose, sucrose, or sugar sources such as molasses; alcohols, such as glycerol and mannitol; organic acid, such as citric acid and acetic acid; and various natural products which may contain in addition to carbonaceous substances various other nutrient materials. Nitrogen sources include proteins, such as casein, zein, lactalbumin; protein hydrolyzates, proteoses, peptones, peptides, and commercially available materials, such as N–Z Amine which is understood to be a casein hydrolyzate; also corn steep liquor, soy bean meal, gluten, cotton seed meal, fish meal, meat extracts, stick liquor, liver cake, yeast extracts, distillers' solubles, and the like; amino acids, urea, ammonium and nitrate salts, and so forth. Inorganic cations, such as sodium, potassium, calcium, magnesium, and so forth, and anions, such as the chloride, sulfate, phosphate, and various combinations of these anions and cations in the form of mineral salts are advantageously used in the fermentation. The so-called trace elements, such as boron, cobalt, iron, copper, zinc, manganese, chromium, molybdenum, and still others may be used to advantage. Generally, the sulfur of the antibiotic and the trace elements occur in sufficient quantities in the carbonaceous and nitrogenous constituents of the medium, particularly if they are derived from natural sources, or in the tap water, and the addition of further quantities of these may be unnecessary.

The fermentation is aerated in the customary manner by forcing sterile air through the fermenting mixture usually at the rate of about 1 volume of air per volume of fermentation medium per minute. To minimize contamination with foreign microorganisms, the fermentation vessels should be closed and a pressure of 2–15 pounds above atmospheric pressure maintained in the vessel. Mechanical agitation in addition to the agitation provided by the aeration is generally advisable. Antifoaming agents, such as 1 percent octadecanol in lard oil, may be added from time to time as required to prevent excessive foaming.

Fermentation is conducted at a temperature preferably on the order of 26–30° C. but may be as low as 17° C. or as high as 42° C.

The time required for maximum production of antibiotics will vary considerably depending upon other conditions of the fermentation. Generally, about 48 hours is required before appreciable quantities of the antibiotic are detected in the medium. The production of the antibiotic increases with the time, and the fermentation may run as long as 120 hours. The hydrogen ion conditions normally vary from about pH 6–pH 8.0, although deviations from these values are permissible.

EXAMPLE I

An inoculum suitable for starting a large scale fermentation was prepared in the following manner.

Five to ten ml. of sterile water is used to suspend the surface growth of an agar test tube slant of the culture. The resulting suspension of spores and bits of mycelium is used to inoculate two 100 ml. lots of sterile medium in 500-ml. Erlenmeyer flasks. The two flasks, after inoculation, are incubated on a reciprocating shaker at about 28° C. for about 2 days, after which the 200 ml. of primary inoculum is used to inoculate 6 liters of sterile medium in a 9-liter glass bottle, which in turn is incubated, with aeration, usually for a day or so at about 28° C. The 6 liters of bottle culture is then used to inoculate 100–200 liters or more of sterile medium in a fermenter tank. For larger lots, 500 liters or more, larger inocula are ordinarily obtained by combining two or more 6-liter bottle inocula.

A fermentation medium of the following composition:

| | |
|---|---|
| Corn steep liquor | grams_ 12.5 |
| Mannitol | do_ 10.0 |
| Sodium chloride | do_ 2.0 |
| $(NH_4)_2HPO_4$ | do_ 2.0 |
| $KH_2PO_4$ | do_ 1.5 |
| $MgSO_4 \cdot 7H_2O$ | do_ 0.25 |
| Hoagland's Salt Solution [1] | ml_ 1.0 |

[1] D. R. Hoagland and W. C. Snyder appearing in the Proceedings of the American Society for Horticultural Science, volume 30, pages 288–294, 1933.

was made up to 1,000 milliliters with water and adjusted to pH 7–7.2 with aqueous sodium hydroxide.

Fifteen hundred liters of this medium was placed in a 500 gallon fermenter tank, sterilized about 60 minutes at 15 pounds steam pressure (120° C.), and inoculated with 12 liters of 23-hours-old bottle culture as described above. The pH was 6.96 before sterilization and 6.68 after sterilization. The mixture was fermented for 112.5 hours at 26–29° C. (most of the time 27–28° C.).

In addition to the above fermentation, a number of like fermentations were conducted under varying conditions as illustrated in the following table. The assay results were obtained using the organism *Streptococcus haemolyticus* Strain C–203 as a test organism with Difco-Bacto Brain-Heart Infusion reconstituted with water and 1½ percent agar as the growth medium.

ployed as will be evident from the specific examples which follow:

A preferred isolation procedure involves the steps of adsorbing the antibiotic from the filtered fermentation liquor onto activated carbon and thereafter eluting the activity with a polar solvent. The activity is adsorbed on the charcoal at the natural pH of the fermentation liquor which may be from about pH 6.5 to 8.0. The eluant is, preferably, a water-miscible polar solvent, such as a 95 percent acetone–5 percent water mixture. No particular adjustment of the hydrogen ion concentration of the eluant is necessary. Instead of aqueous acetone, we may use methanol acidified to a pH of 2 to 3 or at a pH as high as 9. Other alcohols such as ethyl alcohol, the propanols, the butanols, and the like, may also be used as eluants. These may be cut with water to 50 percent or more when desired. Other hydroxylated, water miscible polar solvents include the Cellosolves, such as the ethyl ether of ethyleneglycol, and the like. Dilute acids such as twentieth normal hydrochloric acid and acetic acid may also be used as the eluant to recover the adsorbed antibiotic from the charcoal. Other polar solvents which may be used to recover the activity from the activated carbon include pyridine, aqueous solutions of phenol and still others of similar type.

The adsorption and elution may be carried out in various ways familiar to those skilled in the art. The filtered fermentation liquor may be simply stirred with the activated carbon and then filtered and the activity recovered from the filter cake by passing the eluant through the cake or by stirring it with the eluant. Another common procedure would be to pass the fermentation liquor through a column packed with activated carbon and thereafter pass the eluant through the column. Washing with water to remove water soluble impurities which are not strongly adsorbed on the activated carbon may precede the elution.

After recovering the activity from the activated carbon, it is generally desirable to concentrate the eluant. If desired, the concentration may proceed to dryness and the material stored until ready for further purification. Because of the very high antitrypanosome activity of the

| Example | Capacity of Tank in Gallons | Liters of Medium | Inoculum | | Temp., °C. | Aeration—Ratio: Vol. of Air to Vol. Medium | pH | | Assay Zone Widths |
|---|---|---|---|---|---|---|---|---|---|
| | | | Liters of Bottle Culture | Age of Bottle Culture in Hours | | | Time in Hours of Fermentation | pH | |
| I | 500 | 1,500 | 12 | 23 | 26–29 | 0.85 | *0 | 6.96 | |
| | | | | | | | 0 | 6.68 | |
| | | | | | | | 96 | 6.22 | 29.0 |
| | | | | | | | 112.5 | 6.64 | 31.2 |
| II | 100 | 200 | 6 | 28.5 | 28 | 0.95 | *0 | 7.02 | |
| | | | | | | | 0 | 6.72 | |
| | | | | | | | 48 | 6.52 | 23.3 |
| | | | | | | | 72 | 7.13 | 27.7 |
| | | | | | | | 89 | 7.22 | 31.3 |
| III | 100 | 200 | 6 | 26 | 28 | 0.95 | *0 | 7.26 | |
| | | | | | | | 0 | 6.72 | |
| | | | | | | | 74.5 | 6.43 | 31.3 |
| | | | | | | | 91.5 | 6.70 | 32.7 |
| IV | 200 | 400 | 6 | 30.5 | 27–29 | 1.00 | *0 | 7.18 | |
| | | | | | | | 0 | 6.55 | |
| | | | | | | | 72.5 | 6.80 | 29.2 |
| | | | | | | | 89 | 7.24 | 30.6 |

*Before sterilization. Without the asterisk, "0" indicates after sterilization.

ISOLATION PROCEDURES

Several methods of recovering the antibiotic from the fermentation liquor, which depend upon the physical and chemical properties of the antibiotic, have been worked out. In general, it is preferable to filter the fermentation liquor to remove the mycelia and other insoluble components of the fermentation by filtration at the pH of the harvest. A filter aid, such as diatomaceous earth, is employed. The antibiotic may then be adsorbed on an adsorbent and eluted therefrom. Solvent extraction, chromatography, and salting out procedures are also emmaterial, it may be suitable for use in the treatment of animals at this state of the procedure. In fact, the antibiotic is so highly active that the fermentation liquor itself has been found to be effective in vivo against *Trypanosoma equiperdum*.

Further purification may be carried out by activated carbon chromatography. In this procedure a column of activated charcoal is prepared and the concentrated antibiotic dissolved in a suitable solvent such as 50 percent acetone–50 percent water and passed through the column. The column is then developed by the continued passage of a similar solvent until the weakly adsorbed impurities in the column are eluted and removed. When the antibiotic activity commences to come through the column as determined by simple activity tests of the type described herein elsewhere, a stronger eluant of the type described above is then passed though the carbon bed and the activity thus recovered.

The eluant may be concentrated or dried by lyophilization. Frequently, crystals of the antibiotic are recovered as a result of the concentration step.

Further purification of the antibiotic may be achieved by several methods, some of which will be illustrated hereinafter. A preferred method is the use of normal butanol and a partition column made up of a diatomaceous earth as illustrated in Example 9. It will be understood, of course, that these procedures are merely exemplary and are not meant to be taken as restricting the present invention to any particular method of purification.

EXAMPLE V

*Preliminary purification.—Adsorption column*

The fermented liquor from several tanks as described above was pooled to give a mash volume of 1,450 liters at pH 7.1. The mash was filtered with the aid of Hyflo Super-Cel (diatomaceous earth) to give 1,300 liters of filtrate. Assay indicated a total of 5.64 grams of pure antibiotic in the 1,300-liter solution. 1,950 grams of Darco G-60 (activated charcoal) was added, and the mixture was stirred for one-half hour. 5,850 grams of Celite 545 (diatomaceous earth) was added, and after allowing the mixture to attain homogeneity during stirring, it was filtered. The Darco-Celite filter cake was slurried in 40 liters of water for 5 minutes and filtered. The washed filter cake was mixed with 20 liters of water to make a thick homogeneous slurry which was poured into a glass column of 9 inch inner diameter. The resulting column was about 24 inches high. This column was developed with a solution of 95 percent acetone–5 percent water. A total of 68.5 liters of this solution was used for developing the column.

The first 65 liters of percolate were collected, the first 10 liters as one cut, and the next 55 liters as a second cut. These cuts contained respectively 17 percent and 46 percent of the original 5.64 grams of activity. The first cut was concentrated under reduced pressure to an aqueous solution of 2 liters, and the second cut was similarly concentrated to 3.5 liters of aqueous solution. Each concentrate was then separately lyophilized, yielding as follows:

Cut No. 1.—46 grams shown by assay to contain the equivalent of 0.94 gram crystalline antibiotic.

Cut No. 2.—59.5 grams shown by assay to contain the equivalent of 1.92 grams crystalline antibiotic.

EXAMPLE VI

*Preliminary purification.—Adsorption-elution procedure*

Three hundred fifty liters of mash at pH 7.4 was filtered with the aid of Hyflo Super-Cel to give 300 liters of filtrate. The pH was adjusted to 6–7, and 600 grams of Darco G-60 was added. The mixture was stirred for one-half hour, about 1,200 grams of Hyfio Super-Cel was added, and the slurry was stirred to homogeneity and filtered. The filter cake was slurried in 10 liters of water for 5 minutes and filtered. The washed cake was slurried in a solution of 5,700 ml. of acetone and 300 ml. of water for 20 minutes and filtered. The volume of this first eluate was 5.5 liters. The residual filter cake was re-eluted twice in the same manner giving second and third eluates of 5.4 liters and 4.6 liters respectively.

The 3 eluates were pooled to give a solution of 15.5 liters. The pH was adjusted to 6–6.5, and the solution was concentrated under vacuum to an aqueous solution of 1.5 liters. The pH of the concentrate was adjusted to pH 6–6.5, and the solution was lyophilized. The yield was 25.5 grams.

EXAMPLE VII

*Preliminary purification.—Solvent extraction*

The fermentation mash from tank 60 (prepared substantially as in Examples I–IV) was treated just as described in Example VI except that the final aqueous concentrate was not lyophilized. The volume of the concentrate was 2 liters, and this solution was adjusted to pH 2 (with hydrochloric acid) and extracted twice with 1 liter each time of n-butanol. The aqueous residue was adjusted to pH 7 with aqueous sodium hydroxide and saturated with about 1,200 grams of ammonium sulfate. The resulting mixture was extracted three times with 1 liter each time of butanol. A certain amount of insoluble material which settle out at the interface during extraction was kept from the extracts. The following tabulation indicates the results of these extractions:

| Solution | Total Solid in Grams | Total mgm. of Pure Antibiotic (Calculated) |
|---|---|---|
| Original concentrate | 57.4 | 976 |
| First butanol wash pH 2 | 29.1 | 46 |
| Second butanol wash pH 2 | 7.5 | 45 |
| Aqueous residue | 23.5 | 876 |
| First butanol extract pH 7 | 7.26 | 497 |
| Second butanol extract pH 7 | 3.9 | 208 |
| Third butanol extract pH 7 | 1.43 | 80 |

The first and second extracts were combined, desolventized, concentrated, and lyophilized to give material which assayed 60 γ of activity per mg.

EXAMPLE VIII

*Further purification.—Adsorption column*

An adsorption column was prepared as follows: 3,000 grams of celite 545 and 1,000 grams of Darco G-60 were mixed intimately in a pail tumbler. To this was added 2,000 ml. of a 50 percent acetone–50 percent water solution, and the whole was mixed thoroughly. The final homogeneous mixture was packed with tamping into an inverted 20-liter bottle, the bottom of which had been cut off, to form a column 11 inches in diameter and 13–14 inches high.

Samples prepared by the process of Examples V and VI were combined to give approximately 125 grams of crude antibiotic. This material, containing a total of about $126 \times 10^6$ activity units, or 1,000 units per mg., was dissolved in 1 liter of 50 percent acetone–50 percent water solution, and the resulting solution was added to the top of the column. The column was developed with 46 liters of 50 percent acetone–50 percent water solution. The percolate was fractionated as follows:

| Fraction | Volume in liters | Total solids in grams | Total Activity Units |
|---|---|---|---|
| A | 8.5 | 7.56 | |
| B | 6.9 | 10.6 | $19.4 \times 10^6$ |
| C | 10.2 | 7.7 | $79.8 \times 10^6$ |
| D | 9.4 | 3.8 | $31.2 \times 10^6$ |
| | | 29.66 | $130 \times 10^6$ |

The last three fractions were desolventized under reduced pressure and lyophilized with the following results:

| Fraction | Weight in grams | Units per mg. |
|---|---|---|
| B | 10.3 | 1,500 |
| C | 7.7 | 8,640 |
| D | 3.6 | 8,500 |
|  | 21.6 |  |

The total recovery of activity units in the three dried samples was about $112 \times 10^6$ units. 1 γ of crystalline antibiotic=45 activity units.)

EXAMPLE IX

Further purification.—Partition column n-Butanol and water were stirred together in a separatory funnel and separated to give a pair of mutually saturated solutions. Approximately 500 ml. of n-butanol was added to about 15 liters of butanol saturated with water, so that the solvent phase used in this column was butanol not quite saturated with water.

One kilogram of acid-washed Celite 545 was intimately mixed with 500 ml. of aqueous phase, and the mixture was packed to form a column 42 sq. cm. in cross section and about 83 cm. high.

Samples from Examples V and VI weighing 14.9 grams, and containing about 8,850 activity units per mg., were pooled and added to about 153 ml. of aqueous phase, and the mixture was stirred constantly at room temperature while the pH was brought to 2.0. After further stirring, the mixture was filtered to remove a small amount of insoluble material. From the filtrate 3 ml. was removed for assay and total solids determinations, and the remaining 150 ml. was mixed with 300 grams of acid-washed Celite 545. The resulting mixture was packed on top of the column, adding thereto another 25 cm. to give a total height of 108 cm. The column was then developed with solvent phase, and the percolate was cut as follows:

| Fraction | Volume in ml. | Accumulated Volume | Total Solids in mg./ml. |
|---|---|---|---|
| F1 | 1,120 |  | 4.3 |
| F2 | 1,070 | 2,190 | 0.52 |
| F3 | 675 | 2,865 | 0.48 |
| F4 | 800 | 3,665 | 0.38 |
| F5 | 900 | 4,565 | 0.40 |
| F6 | 1,070 | 5,635 | 0.22 |
| F7 | 1,020 | 6,655 | 0.23 |
| F8 | 1,040 | 7,695 | 0.21 |
| F9 | 1,200 | 8,895 | 0.14 |
| F10 | 1,060 | 9,955 | 0.45 |
| F11 | 640 | 10,595 | 1.21 |
| F12 | 4,000 | 14,595 | 0.56 |
| F13 |  |  | 0.94 |

Fractions F10, F11, and F12 were combined, concentrated under reduced pressure to desolventize, and lyophilized to give 3.34 grams of product.

EXAMPLE X

Crystallization of the new antibiotic 3.34 grams of partially purified antibiotic was dissolved in 80 ml. of water at 65° C., and the pH of the solution was adjusted to 1.5 with dilute hydrochloric acid. The mixture was filtered to remove a certain amount of insoluble gum. The pH of the filtrate was adjusted to 4.0 with dilute aqueous sodium hydroxide, a seed crystal was added, and the mixture was left overnight at 4–5° C. The next morning the crystals were filtered, washed with cold water, and dried in a vacuum desiccator over Drierite at <1 mm. pressure for about 24 hours—yield, 1.19 grams.

EXAMPLE XI

Crystallization of the new antibiotic after butanol extraction of impurities A number of samples purified through the first adsorption such as the sample of Example VI were pooled and carried through the second adsorption column purification as described in Example VIII. The antibiotic rich portion of the percolate was concentrated under reduced pressure to a small aqueous volume and lyophilized as in Example VIII. A sample weighing 1.67 grams and containing a total of about $12.8 \times 10^6$ activity units was dissolved in 80 ml. of water, and the solution was made 0.1 N with respect to hydrochloric acid by adding acid. This solution was extracted twice with 80 ml. each time of n-butanol, thereby removing about 1.07 grams of total solids, but only about 9 percent of the activity. The pH of the residue was adjusted to 6.5 and the resulting solution was desolventized under reduced pressure and then concentrated to 5–10 ml. and kept chilled. The crystalline product was filtered, redissolved in about 10 ml. of water at pH 3–4 by warming slightly, and filtered. The filtrate was chilled, and the resulting crystals were filtered, washed with cold water, and dried—yield, 145 mg. of white crystals.

EXAMPLE XII

Recrystallization of and preparation of analytical samples 4.522 grams of various pooled lots of crystalline antibiotic (prepared as described in Example X) was dissolved in 200 ml. of water at 60° C., and the pH of the solution was adjusted to 2.5. The solution was filtered, and the filtrate was adjusted to pH 4 and left overnight at 4–5° C. The crystals were filtered and the same recrystallization procedure was repeated 4 times. The final recrystallization included a decolorizing step with a small amount of charcoal. The final product was 1.89 grams (after drying at 2 mm. pressure) of analytical sample. Of this sample, 1.25 grams was further dried for two hours in abderhalden pistol at the boiling point of chloroform. The product obtained consisted of mats of thread-like (filoform) crystals. The principal vibration directions and their corresponding refractive indices were difficult to determine and are not given in view of the possibility of error.

EXAMPLE XIII

| | | |
|---|---|---|
| Dextrin | percent | 1 |
| N–Z Amine, A (hydrolyzelcasein) | do | 1 |
| NaCl | do | 0.2 |
| $(NH_4)_2HPO_4$ | do | 0.2 |
| $KH_2PO_4$ | do | 0.15 |
| $K_2HPO_4$ | do | 0.05 |
| $MgSO_4 \cdot 7H_2O$ | do | 0.025 |
| Hoagland's Salt Solution | percent (by vol.) | 0.1 |
| Tap water to 100%. | | |

100 mls. of the above medium in a 500 ml. Erlenmeyer flask was sterilized for twenty minutes at 15 pounds steam pressure and inoculated with 3 ml. of pre-formed inoculum. The flask was incubated on a reciprocating shaker at 28° C. for 72 hours. The fermented beer was found to be active against *Trypanosoma equiperdum*.

EXAMPLE XIV

Equal volumes of n-butanol and the above beer were shaken together at the indicated pH values and then separated. The tabulation below shows the activities in the butanol extracts and aqueous residues with the extraction coefficients.

| | Butanol | Water | K |
|---|---|---|---|
| pH 2 | 8 | 135 | 0.06 |
| pH 5 | 51 | 100 | 0.5 |
| pH 7 | 49 | 88 | 0.6 |
| pH 9 | 23 | 123 | 0.2 |

EXAMPLE XV

A quantity of the above beer was saturated with ammonium sulfate. Five liters of this solution was extracted twice with 2.5 liters each time of n-butanol. Another 5-liter lot was extracted twice with 2.5 liters each time of acetone.

The two butanol extracts were pooled and found to contain substantially all of the activity of the beer. The two acetone extracts were pooled and also found to contain all of the activity of the beer.

EXAMPLE XVI 11.9 liters of a similar beer was stirred at harvest pH with 55 gm. of Darco G–60 for one half hour. The suspension was filtered with the aid of a small amount of Celite and washed on a Buchner funnel with 500 ml. of water.

The washed cake was then slurried about twenty minutes with 300 ml. of acetone and filtered. The residual cake was re-eluted twice with 300 mls. each time of 95 percent acetone. The three acetone eluates were pooled and assayed, the results showing a recovery of 35 percent of the activity in the beer. The pooled solution was concentrated under vacuum to an aqueous concentrate which was lyophilized giving 3.64 gms. of solids, determined by assay to represent material purified 11 fold compared to the antibiotic in the beer.

Beta methoxyethanol or β-ethoxyethanol may be substituted for butanol or acetone in the above extraction.

EXAMPLE XVII 50 mg. of the antibiotic of Example XII, free base, was dissolved in about 5 ml. of water by the addition of 0.1 N hydrochloric acid, and 5 ml. of a saturated aqueous picric acid solution was added. The resulting crystalline precipitate was centrifuged and washed with about 5 ml. of cold water.

The product was recrystallized three times from water with a hot filtration (60–75° C.) in the final step, and dried for 24 hours at 1 mm. and finally over $p_2O_5$ at 1 mm. and 110° C. for 4 hours. Yield: 35 mg. of bright yellow crystals of the picrate salt.

*Analysis.*—Calc'd for $C_{17}H_{18}O_{15}N_9S$: C, 32.9; H, 2.91; N, 20.3; S, 5.17; O (diff.), 38.1. Found: C, 33.19; H, 3.13; N, 20.19; S, 5.70; O (diff.), 37.79.

Melting point 143–144° C. (uncorr.) with slight decomposition.

Ultraviolet λ max. (mμ) 253 (20 γ/ml. EtOH).

EXAMPLE XVIII 150 mg. of the antibiotic, free base, was dissolved in 5 ml. of glacial acetic acid and treated with 5 ml. of glacial acetic acid saturated with hydrogen chloride.

The white precipitate of the hydrochloride salt which formed was removed by filtration, washed with 10 ml. of glacial acetic acid and 10 ml. of anhydrous ethyl ether, and dried for 24 hours over Drierite (calcium sulfate, anhydrous) at 1 mm. and room temperature.

EXAMPLE XIX

A solution of 150 mg. of the free base in about 10 ml. of absolute ethanol was treated with a mixture of 5 ml. of absolute ethanol and about 4 drops of concentrated sulfuric acid. The resulting precipitate of the sulfate salt was filtered, washed with absolute ethyl ether, and dried at 1 mm. for 24 hours. The product was amorphous.

EXAMPLE XX

A saturated aqueous solution containing about 150 mg. of the free base was treated with a saturated aqueous methyl orange solution to yield a colored, crystalline precipitate of the helianthate salt.

We claim:

1. Nucleocidin having the following structure:

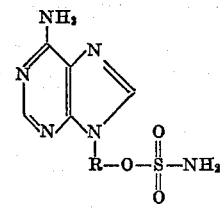

where R is the residue of a monose.

2. An anticiotic substance effective against trypanosomes and amoebae selected from the group consisting of a substance containing the elements, carbon, hydrogen, nitrogen, sulphur, and oxygen, in substantially the following proportions: carbon 34.0 percent; hydrogen 4.0 percent; nitrogen 21.6 percent, sulphur 8.3 percent; oxygen 32.0 percent, in the following structure:

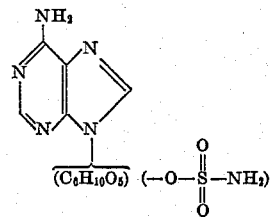

and having an optical rotation of $[\gamma]_D^{24.5} = -0.35$, having an infrared absorption spectrum when measured in a potassium bromide disc substantially as shown in Figure 1 and an ultraviolet absorption spectrum in an aqueous solution at pH 7 substantially as shown in Figure 2, and the salts of said antibiotic.

3. A method of producing an antibiotic effective against trypanosomes and amoebae which comprises the step of aerobically fermenting an aqueous nutrient medium with a microorganism of the species *Streptomyces calvus* within the temperature range of 17° C. to 42° C. for a period of at least 48 hours at a hydrogen ion concentration within the range of about pH 6–pH 8.

4. A method of producing an antibiotic effective against trypanosomes and amoebae which comprises the steps of aerobically fermenting an aqueous nutrient medium with a microorganism of the species *Streptomyces calvus* within the temperature range of 17° C. to 42° C. for a period of at least 48 hours at a hydrogen ion concentration within the range of about pH 6–pH 8, thereafter contacting the water soluble components of the fermentation liquor with the adsorbent, separating the adsorbent from the liquid and recovering the antibiotic from said adsorbent by elution with a polar solvent.

5. A method of producing an antibiotic effective against trypanosomes and amoebae which comprises the steps of aerobically fermenting an aqueous nutrient medium with a microorganism of the species *Streptomyces calvus* within the temperature range of 17° C. to 42° C. for a period of at least 48 hours at a hydrogen ion concentration within the range of about pH 6–pH 8, thereafter contacting the water soluble components of the fermentation liquor with activated charcoal, separating the charcoal from the liquid and recovering the antibiotic from said charcoal by elution with a polar solvent.

6. The process in accordance with claim 5 in which the solvent is a mixture of acetone and water.

(References on following page)

References Cited in the file of this patent

UNITED STATES PATENTS

| | | |
|---|---|---|
| 2,407,686 | Ruskin | Sept. 17, 1946 |
| 2,649,401 | Haines et al. | Aug. 18, 1953 |

OTHER REFERENCES

Annals of the N.Y. Acad. of Sci., 60 (1954), page 5.
Baldacci: Archives fur Mikrobiologie Bd. 20, pp. 347–357, 1954.
Thomas et al: Abstracts of Papers 95 and 96 presented at 4th Annual Symposium on Antibiotics, Oct. 17–19, 1956, Washington, D.C., 2 pages.
Waksman: Reprint from Bact. Rev., vol. 21, March 1957, page 5.
Pridham: Applied Microbiology, January 1958, pp. 52–79.
Baker et al: J. Amer. Chem. Soc., Jan. 5, 1955 (pp. 1–24).